Aug. 28, 1945.   M. WATTER   2,383,634
MAIN FRAME STRUCTURE FOR AIRFOILS OR THE LIKE
Filed Feb. 20, 1943   4 Sheets-Sheet 2
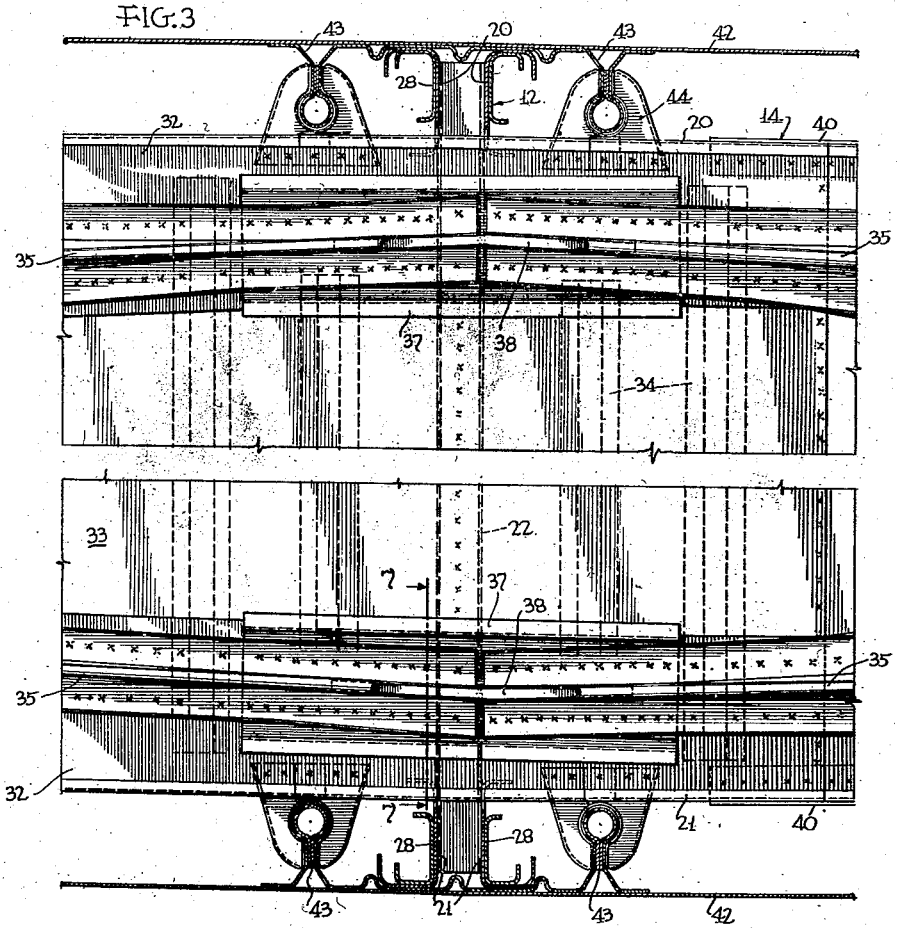
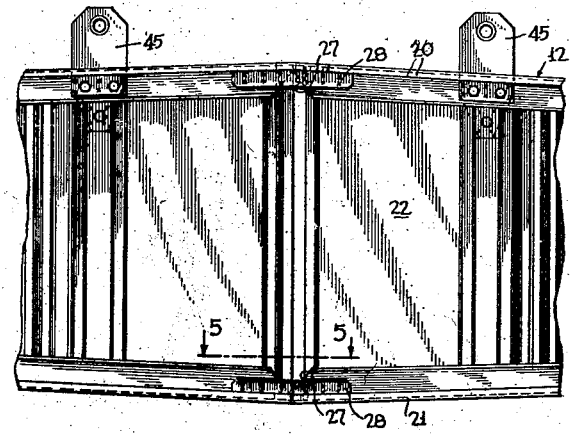
INVENTOR
Michael Watter.
BY
ATTORNEY Aug. 28, 1945. M. WATTER 2,383,634
MAIN FRAME STRUCTURE FOR AIRFOILS OR THE LIKE
Filed Feb. 20, 1943 4 Sheets-Sheet 3
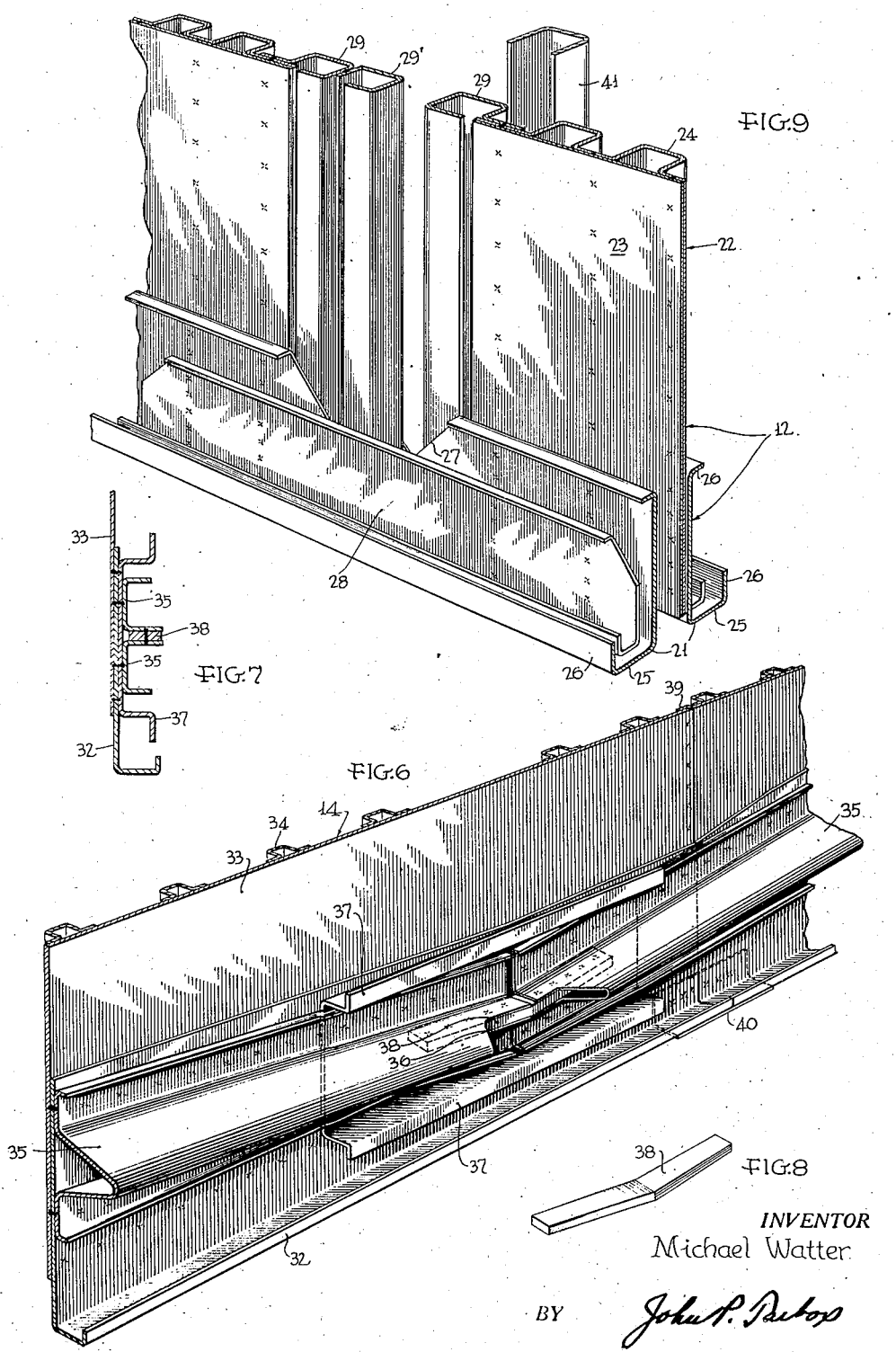

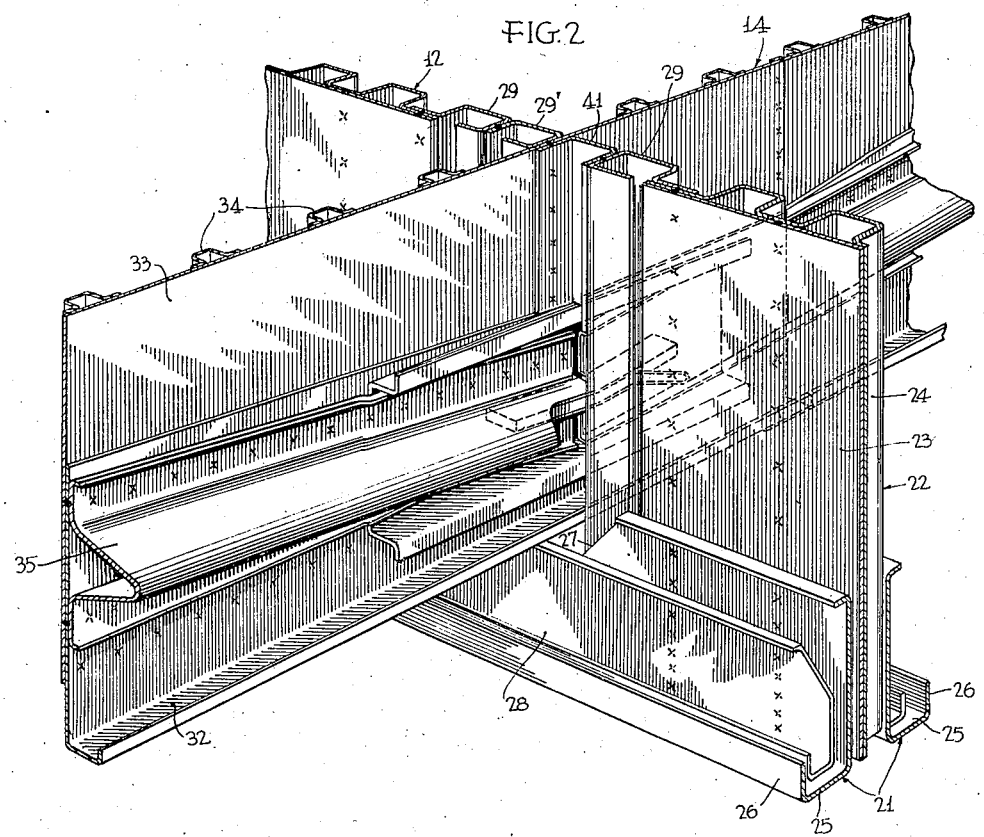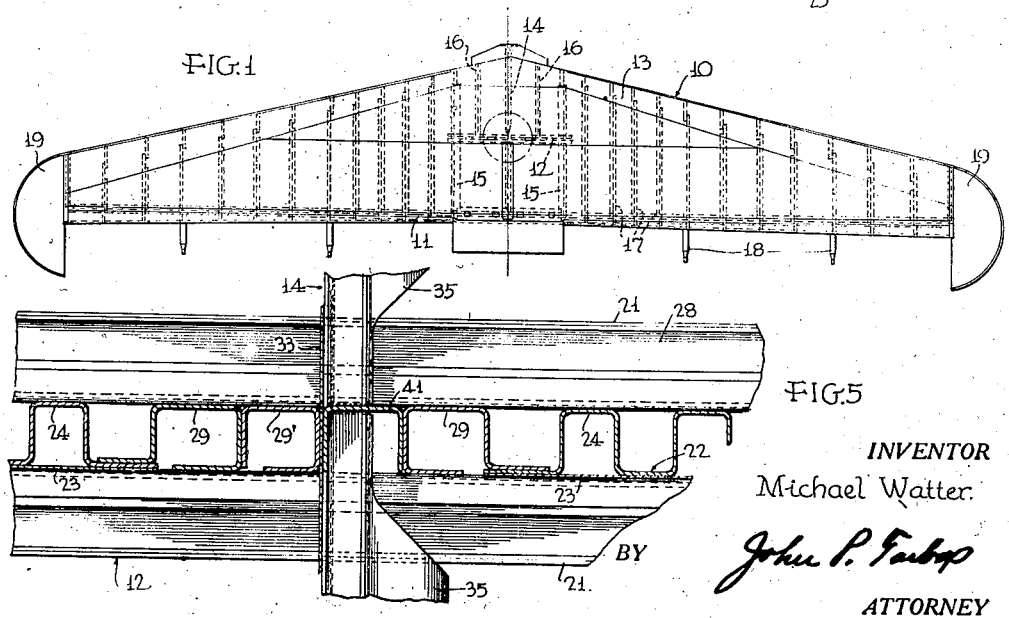

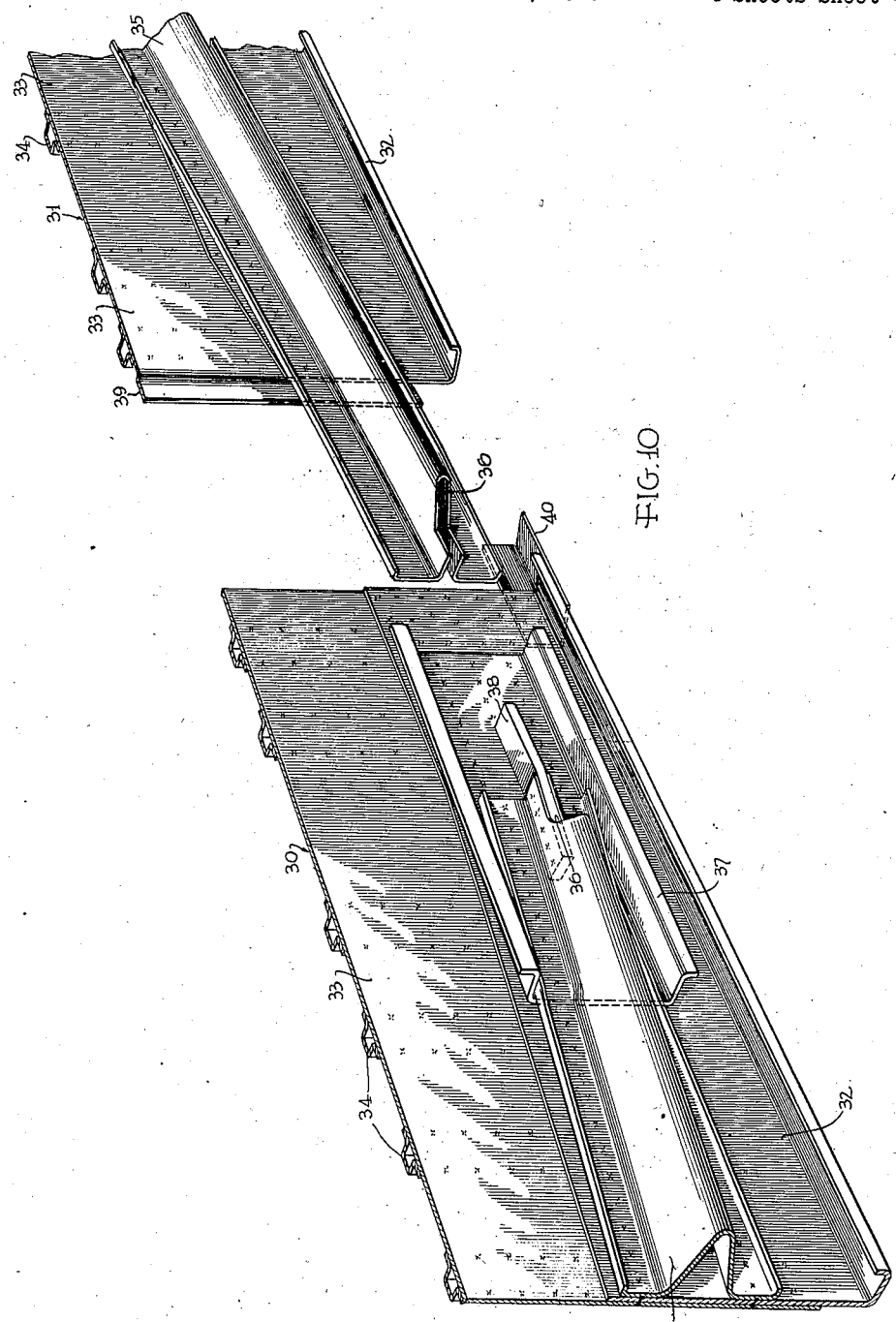

Patented Aug. 28, 1945

2,383,634

UNITED STATES PATENT OFFICE 2,383,634

MAIN FRAME STRUCTURE FOR AIRFOILS OR THE LIKE

Michael Watter, Philadelphia, Pa., assignor to Edward G. Budd Manufacturing Company, Philadelphia, Pa., a corporation of Pennsylvania Application February 20, 1943, Serial No. 476,535

6 Claims. (Cl. 189—36)

The invention relates to the main load-carrying frame of airfoils such as that provided in the main wings or fixed tail surfaces of airplanes.

More particularly it relates to a joint between two load-carrying frame members, such as a spar and a rib, which normally cross each other at substantially right angles, and to the construction of the members and the joint between them which facilitates their fabrication and assembly and provides an assembled structure in which the members are not materially weakened where they cross each other, but are rather mutually interbraced to provide a strong frame structure capable of carrying all the loads to which it is normally subjected.

It is a particular object of the invention to provide a structure of this class which may be readily built up of light-gauge high strength, such as stainless steel, sheet metal members so formed as, in the final assembly, to impart the maximum of strength for the minimum of weight, and so as to facilitate the joinder of the parts by simple spot welding operations.

This and other objects are in large part attained by the construction and combination of parts which will be described in full in the following detailed description forming a part hereof.

In the drawings in which a preferred embodiment of the invention is shown as applied to an aircraft structure;

Fig. 1 is a plan view of a horizontal stabilizer for an airplane in which the invention is shown embodied;

Fig. 2 is a fragmentary perspective view, on an enlarged scale, of the lower portion of the intersection between the central rib and the intermediate spar of the stabilizer, the view being taken in the region indicated by the dot and dash circle of Fig. 1;

Fig. 3 is a fragmentary chordwise vertical section through the stabilizer showing the rib in elevation in the region where it passes through the spar;

Fig. 4 is a fragmentary elevational view, on a reduced scale as compared with Fig. 3, of the central portion of this spar;

Fig. 5 is a fragmentary horizontal sectional view of the rib and spar at their intersection, the section being taken some distance above the point where the lower rib chord passes through the spar.

Fig. 6 is a fragmentary perspective view of the lower central portion of the rib in the region where it intersects the spar;

Fig. 7 is a fragmentary vertical sectional view through the portion of the rib shown in Fig. 6 approximately in the location indicated by the line 7—7 in Fig. 3;

Fig. 8 is a detail perspective view of an angle strip forming part of the joint between the rib sections;

Fig. 9 is a fragmentary perspective view of the portion of the spar shown in Fig. 2, with the rib removed therefrom and a channel securing and filler strip located laterally of the spar in position for movement laterally into the slot in the spar;

Fig. 10 is a view similar to Fig. 6 but showing the rib sections in separated relation, as they appear prior to final assembly.

In the drawings, referring to Fig. 1, there is shown in plan a stabilizer 10, the frame of which comprises the main rear spar 11 extending from tip to tip, the short intermediate spar 12 and the nose structure 13 serving as a front spar and extending also from tip to tip. The three spars 11, 12 and 13 are connected centrally by a strong rib 14 and adjacent the ends of the intermediate spar by additional strong ribs 15, 15. Additional ribs 16 interconnect the nose 13 and the intermediate spar and, outwardly of the ribs 15, the nose 13 and rear spar are interconnected by additional suitably spaced ribs, designated 17, certain of these ribs have hinge brackets as 18 secured to them for supporting the elevator at the trailing edge of the stabilizer. The tips 19 secured to outer ends of the spars 11 and 13 complete the ends of the stabilizer. All parts of the framing of the stabilizer are suitably covered by a sheet metal skin curved to give the desired aerodynamic characteristics to the stabilizer.

The structure to which the present invention particularly relates centers about the section indicated by the dot and dash circle indicated in Fig. 1, where the strong rib 14 intersects the intermediate spar 12, although it will be understood that this structure may be used in other relations.

As shown in Figs. 2, 3, 4, 5, and 9, this intermediate spar comprises spaced top and bottom chords 20 and 21 interconnected by a stiff web 22. As shown, the web consists of a flat sheet 23 reinforced by a transversely corrugated sheet 24 rigidly secured thereto as by spot welding at the bottoms of the corrugations contiguous to the sheet.

Each of the chords consists of angles 25 flanking the opposite margins of the composite web 22 which angles can be readily spot welded to the opposite sides by welding one of them to the double thickness of the flat sheet 23 and the contiguous corrugations of corrugated sheet 24 and the other to the bottoms of the corrugations remote from the flat sheet. For additional stiffness and strength the angle chord members 25 may be provided with edge flanges 26, at their opposite margins.

As clearly shown in Fig. 4, the spar 12 decreases gradually in height from the center outwardly to give the appropriate taper to the stabilizer from the center toward the tips and this necessitates that the chords be likewise inclined. To facilitate bending of the chord members so as to form an angle at the center, the vertically deep arms of the angles 25 are cut out with a V-notch as shown at 27 and the remaining arm is bent to the desired angle before securing the chords to the web.

When bent to the desired angle, they are secured to the web and a reinforcing bridging angle, as 28, is nested with each of the angular chord members 25, overlapping it on opposite sides of the V-notch, and is spotwelded to both arms of the respective members 25, thus carrying substantially the full strength of the chords across the cut out portions.

Another advantage of the cut out portions in the chords of the spars is that it permits a deeper overall rib to be extended through the spar, since the bridging angles 28 are not as deep as the chord angles 25, and thus permits the spacing of the marginal contoured portions of the rib just the right distance to enable proper securement of the stringer reinforced skin blanket thereto and directly through the tops of the spar chords to the spar as well, as shown in Fig. 3.

At this central location of the spar 12 the flat plate 23 is discontinuous and its place and the place of the corrugated reinforcement is taken in this region by one or more flanged channels, as 29, secured through their outwardly extending flanges to the double thickness margin of the web formed by the flat plate and the end contiguous corrugation. An additional channel 29' having but one side wall flanged, and that inwardly, is secured through its other unflanged side wall to the adjacent side wall of one of the channels 29.

A space or slot, as clearly appears in Figs. 4 and 9, is provided between opposing channels 29 and 29' to permit of the passage of the central rib 14 therethrough.

This strong central rib 14 is, for convenience of assembly with the spar 12, made in two sections, a forward section 30 and an aft section 31, see Fig. 10.

Each section is formed with spaced marginal cap strips, as 32, interconnected by a web plate, as 33, having a wide overlap with the cap strips and spot welded thereto in the overlap. To stiffen the web against buckling, its side opposite the side overlapping the cap strips is reinforced by spaced vertical reinforcements 34 of flanged channel section spot welded thereto through the flanges of the channels. The rib sections are further strengthened and stiffened by chord members 35 of generally rectilinear form and of generally hat-shaped cross section, these chord members being secured along the line of overlap between the cap strips and web plate to the double web thickness so provided, the securement being by welding through the base flanges of the hat-shaped section. The laterally projecting hollow portion of the hat-shaped section is relatively deep to afford great stiffness and of generally acute angular shape, this shape facilitating the formation of the joint between the rib sections as will be described hereinafter.

The chord members 35 of the two sections are arranged at a slight angle to each other, to allow making them rectilinear, while conforming to the fore and aft taper of the airfoil, as clearly appears in Figs. 2, 3 and 6, and those of the forward section, see Fig. 10, terminate some distance inwardly of the vertical margin of the web plate 33 and adjacent cap strip 32 of that section. These chord members project laterally from the web 33 a distance which prevents passing the deep hat-shaped section through the slot in the spar.

To permit this passage and at the same time prevent any appreciable weakening of the chords at their passage through the spar slot, the ends of the chords on the two sections have part of their height cut away, as indicated at 36, and in the final assembly these ends come to nearly abutting relation for convenience of access in spot welding the parts together in final assembly, as shown in Fig. 3, substantially in the plane of the aft face of the web of the spar.

To reinforce the almost abutting ends of the chords and to compensate for the strength removed by cutting away the ends of the hat-shaped section thereof, a bridging member, as 37, as shown to be of flanged channel section is positioned and secured as by spot welding to the web 33 and cap strip 32 of the forward rib section, so as to overlap the flanges of the adjacent end of the chord member 35, which is offset to pass over the bottom of the channel of the bridging member and secured by welding its flanges to the triple thickness of metal provided by the overlapping bottom of the channel 37, the cap strip 32 and the web plate 33, as clearly appears in Figs. 7 and 10. Additionally, an angular bar, as 38 is telescoped between the remaining portions of the sides of the laterally projecting hat-section of the chord 35 at the cut away end thereof and spot welded to these portions of the sides thereof to strengthen the chords in this cut away region. This spot welding takes place before the end portion of the chord is spot welded to the triple thickness web above identified, because before welding the ends of the hat-shaped section to the bar 38, it is first necessary to bring the remaining portions of the angular section sides together into contact with the opposite sides of the bar. This has the effect of narrowing the distance between the margins of the flanges on the chord 35, which could not take place if these flanges had been previously welded to the bridging member 37. After the bar 38 is so welded to the chord 35 the flanges of the narrowed end portion (see Figs. 3 and 10) are welded to the triple thickness of metal, above identified.

The aft section of the rib has its chord members 35 extended some distance forwardly of the web thereof, as shown in Fig. 10, to form a final assembly joint with the bar 38 and the bridging member 37 to which it is successively joined when the aft portion is brought into finally assembled relation, as shown in Fig. 6, in identically the manner in which the chord of the forward section is joined to these members. Because the overlapping parts in this final assembly are all aft of the spar, access is readily had for making the spot welds required.

In the final assembly, the rear margin of the web plate 33 of the forward rib section 30 comes into overlapping relation to the slightly offset forward margin 39 of the web 33 of the aft section 31 and is secured thereto by spot welding. The cap strips 33 of the two sections come into abutting relation and may be stiffened across the joint by an angle gusset 40 secured in its overlapping relation to each of the abutting ends of the cap strips. As shown in Fig. 10, this gusset may be part of the forward rib section sub assembly, and joined in final assembly to the aft rib section, but this is not essential since access can be had for welding it to both sections in the final assembly.

As so joined the rib carries substantially its entire strength through the spar, yet is readily assembled therewith, by open and accessible joints, facilitating the welding.

Finally, the rib 14, is securely fastened to the spar 12 and the slot in the spar is closed so that the parts mutually reinforce and brace each other by bringing a channel section securing and filler piece 41 into the slot between the opposed channels 29, 29' flanking the slot in the spar. This channel 41 is of a width equal to the width of the slot less the thickness of the web plate 33 of the rib. Obviously there is no vertical stiffener 34 on the web plate 33 in this region, as appears in Fig. 6.

When the securing and filler piece 41 is brought in place between one of the channels 29, 29' and the web plate 33 it can be readily secured in place by welding one of its side walls to said one of the channels flanking the slot and its other side wall to the double metal thickness provided by the web and the other channel flanking the slot. The open channels readily permit accessibility for spot welding the parts together in this fashion.

The framework formed by the spars and ribs may be covered top and bottom by a skin blanket of any suitable form. In the drawings Fig. 2, there is shown a thin metal skin, as 42, reinforced by spaced longitudinal stringers, as 43. This blanket is secured directly to the flanges of the spar through the double thickness metal provided by the stringer metal and skin and indirectly to the rib cap strips 32 by clips 44 secured to the stringers and cap strips. However, this particular method of skin blanket securement is merely illustrative herein, and is fully described and claimed in another copending application.

In Fig. 4, fixtures 45 have been shown for securing a vertical fin to the top of the stabilizer. These fixtures are merely illustrative and form no part of the present invention, being fully described and claimed in a separate application.

While the invention has been shown and described in a specific embodiment and applied in a given location in an airfoil, it will be understood that in its broader aspects it is subject to wide modification and adaptation to use in other relations than those specifically shown and described herein, and in the appended claims, it is intended to cover such broader as well as the more specific aspects thereof.

What is claimed is:

1. A sectional rib for airfoils adapted to extend continuously through a slot in a spar member to which the rib is secured in final assembly, each of said sections of the rib comprising a web and chord member, the web of one section extending continuously through the spar member and the chords of the sections being joined at the spar, the chords of the sections being partially cut away at the region of passage through the spar, and reinforcing means bridging the cut away portions to restore the strength of the chords in this region, the webs of the sections overlapping and secured together in the overlap.

2. A framework for an airfoil comprising a spar and a rib extending substantially at right angles to each other, the rib passing continuously through a slot in the spar, the rib being constructed in sections, one located principally on one side of the spar and the other on the other side, each section of the rib comprising a web and chords, the chords of the sections where they pass through the spar being partially cut away, and reinforcing means bridging the chords of the rib sections in the cut away region to render them in effect continuous from one section to the other, the webs of the sections also being secured to each other to render the web of the rib continuous.

3. A rib for an airfoil comprising spaced chords and a sheet web interconnecting the chords, the rib being constructed in longitudinal sections for convenience of assembly with a spar, the chords being arranged on the sides of the webs so that their adjacent ends meet each other substantially at the point of intersection of the rib with a spar, means connecting the adjacent ends of the chords of the sections together upon the side of one of the web sections, and means connecting the web sections together upon the side of one of the chord sections, to render the rib of substantially full strength throughout.

4. A load carryfing rib for airfoils divided into sections adapted for assembly with a spar from the opposite sides thereof, the rib extending continuously through a spar without appreciable diminution of strength in the final assembly, each rib section comprising a sheet web and spaced chords secured to the web and projecting laterally thereof, the chords of the sections meeting each other at a slight angle, and means including splice pieces joining the adjacent ends of the chords of the sections together upon the side of one of the web sections so as to carry the chords through the joint at substantially full strength.

5. A load carrying member comprising spaced chords and a web interconnecting them, the member being subassembled into longitudinal sections, and the chords of the sections having their ends meet at a slight angle, at a point inwardly of the end of the web of one section, bridging means secured to the ends of the chords of said one section in subassembly and arranged inwardly of the end of the web of said section, the ends of the chords of the other section extending beyond the web of said section and adapted in final assembly to overlap the web and bridging means of the other section and be secured thereto, the adjacent ends of the webs of the sections also overlapping and being secured together in final assembly.

6. A load carrying member comprising spaced chords and a web interconnecting the chords, said chords being substantially of hat-shaped cross section and secured to the web through the base flanges of the section, and said chords, at at least one end thereof, having the top portion of the crown of the hat-shaped section cut away, and bridging means joining together the remaining sides of the crown at said cut away portion, whereby the strength of the section in the cut away region is largely restored.

MICHAEL WATTER.